United States Patent
Gates et al.

(10) Patent No.: US 9,933,526 B2
(45) Date of Patent: Apr. 3, 2018

(54) TECHNIQUES TO IMPROVE THE PERFORMANCE OF A FIXED, TIMING-BASED RADIO POSITIONING NETWORK USING EXTERNAL ASSISTANCE INFORMATION

(71) Applicant: NextNav, LLC, Sunnyvale, CA (US)

(72) Inventors: Christian Gates, Vienna, VA (US); Arun Raghupathy, Bangalore (IN)

(73) Assignee: NextNav, LLC, Sunnyvale, CA (US)

( * ) Notice: Subject to any disclaimer, the term of this patent is extended or adjusted under 35 U.S.C. 154(b) by 549 days.

(21) Appl. No.: 14/207,400

(22) Filed: Mar. 12, 2014

(65) Prior Publication Data

US 2014/0266910 A1 Sep. 18, 2014

Related U.S. Application Data

(60) Provisional application No. 61/789,951, filed on Mar. 15, 2013.

(51) Int. Cl.
*G01S 19/42* (2010.01)
*G01S 5/02* (2010.01)
*G01S 11/02* (2010.01)

(52) U.S. Cl.
CPC ............. *G01S 19/42* (2013.01); *G01S 5/021* (2013.01); *G01S 5/0252* (2013.01); *G01S 11/02* (2013.01)

(58) Field of Classification Search
CPC .......... G01S 5/0252; G01S 5/02; G01S 5/021; G01S 5/14; G01S 5/06; G01S 5/0221;
(Continued)

(56) References Cited

U.S. PATENT DOCUMENTS

| | | | |
|---|---|---|---|
| 6,420,999 B1 * | 7/2002 | Vayanos | G01S 5/021 342/357.31 |
| 7,378,980 B2 * | 5/2008 | McFarland | G01S 5/0289 340/539.2 |

(Continued)

FOREIGN PATENT DOCUMENTS

| EP | 1245963 A2 | 10/2002 |
|---|---|---|
| EP | 2000820 A2 | 12/2008 |

(Continued)

OTHER PUBLICATIONS

Form PCT/ISA/220, PCT/US2014/025021, "Notification of Transmittal of the International Search Report and the Written Opinion of the International Searching Authority, or the Declaration", 1 page; Form PCT/ISA/210, PCT/US2014/025021, "International Search Report", 4 pages; Form PCT/ISA/237, PCT/US2014/025021, "Written Opinion of the International Searching Authority", 5 pages.

(Continued)

*Primary Examiner* — Chuong P Nguyen
*Assistant Examiner* — Daniel P Malley, Sr.

(57) ABSTRACT

Systems and methods for estimating error associated with one or more range measurements that are used to estimate the position of a receiver. Estimations of range error may be based on surveyed range errors associated with locations near the position of the receiver. Estimations of range error may alternatively be based on comparisons of actual movement by the receiver to estimated movement between estimates of the receiver's positions.

33 Claims, 5 Drawing Sheets

(58) Field of Classification Search
CPC .......... G01S 5/10; G01S 19/42; G01S 19/428; G01S 19/46; G01S 19/48; H04W 64/00
See application file for complete search history.

(56) References Cited

U.S. PATENT DOCUMENTS

| | | | |
|---|---|---|---|
| 9,319,840 B2* | 4/2016 | Porzio Giusto | H04W 4/023 |
| 2002/0183071 A1* | 12/2002 | Shioda | G01S 5/021 455/456.1 |
| 2006/0095348 A1* | 5/2006 | Jones | G01S 5/02 705/29 |
| 2006/0106573 A1 | 5/2006 | Seibert | |
| 2011/0059752 A1* | 3/2011 | Garin | G01S 5/0289 455/456.1 |
| 2011/0177831 A1* | 7/2011 | Huang | G06F 17/3087 455/457 |
| 2012/0019411 A1* | 1/2012 | Trautenberg | G01S 19/20 342/357.24 |
| 2013/0172020 A1* | 7/2013 | Aweya | G01S 5/0252 455/457 |
| 2014/0106773 A1* | 4/2014 | Li | H04W 4/043 455/456.1 |
| 2014/0266910 A1 | 9/2014 | Gates et al. | |
| 2014/0266915 A1 | 9/2014 | Gates et al. | |

FOREIGN PATENT DOCUMENTS

| | | | | |
|---|---|---|---|---|
| JP | EP 1245963 A2 * | 10/2002 | ............ | G01S 5/021 |
| WO | 2009/149417 A1 | 12/2009 | | |

OTHER PUBLICATIONS

U.S. Appl. No. 14/207,458, filed Mar. 12, 2014, Gates et al.
U.S. Appl. No. 14/207,400, filed Mar. 12, 2014, Gates et al.
Chinese Patent Office, roughly-translated portions of Office Action for Chinese Patent Application No. 201480012831.9, including claims under review, 8 pages, dated Oct. 10, 2016.
Chinese Patent Office, Office Action for Chinese Patent Application No. 201480012831.9, 6 pages, dated Oct. 10, 2016.
Applicant, Response to Search Report for European Application 14720768.2, 21 pages, dated Sep. 26, 2016.
Information about Related Patents and Patent Applications, see the section attached hereto entitled Related Patents and Patent Applications for further information.
Gates et al., U.S. Appl. No. 15/481,122, Apr. 6, 2017.

* cited by examiner

TECHNIQUES TO IMPROVE THE PERFORMANCE OF A FIXED, TIMING-BASED RADIO POSITIONING NETWORK USING EXTERNAL ASSISTANCE INFORMATION

CROSS REFERENCE TO RELATED APPLICATIONS

This application claims priority under 35 U.S.C. § 119(e) to U.S. Provisional Patent Application Ser. No. 61/789,951, filed Mar. 16, 2013, entitled TECHNIQUES TO IMPROVE THE PERFORMANCE OF A FIXED, TIMING-BASED RADIO POSITIONING NETWORK USING EXTERNAL ASSISTANCE INFORMATION, the content of which is hereby incorporated by reference herein in its entirety for all purposes.

TECHNICAL FIELD

Various embodiments relate to wireless communications, and more particularly, to networks, devices, methods and computer-readable media for estimating range error.

BACKGROUND

A fixed, timing-based radio positioning system may consist of a set of ranging transmitters (e.g., $Tx_1$ to $Tx_N$) such that a receiver capable of receiving such transmissions can estimate its position. The accuracy of a receiver's position estimate is negatively affected by multiple factors, including: resolution of the transmission signal; synchronization of the transmitters; presence of reflected signals, resulting in the over-estimation of a range between the receiver and a transmitter; uncertainty about the estimated velocity and range of the receiver with respect to any given transmitter due to noise, insufficient signal strength or other radio properties; and poor geometry among the transmitters relative to the receiver, which increases the uncertainty of the position determined using the range from a given transmitter set with poor angular separation among them.

The above characteristics result in a combination of fixed range error biases and fixed range uncertainty functions at any given estimated point within the real plane. That is, a building causing a reflection creates a fixed reflection. An error in synchronization between two transmitters is a fixed error between those two transmitters, within the stability of the synchronization system. Poor geometry or bandwidth-related resolution limits will result in position bias with a fixed histogram based on the geometric properties of the network. These biases are endogenous to the radio positioning system.

Accordingly, if biases can be detected, and the uncertainty of a given range estimate can be reduced, then the quality of position can be improved. With known locations of transmitters, the physical and geometric properties of the transmitter network could enable considerable improvements compared to techniques applied to networks where there is less information about the network. Further, knowledge about the biases detected may be propagated through an error-correction system due to the fixed nature of the radio positioning system and the fixed nature of the biases.

DETAILED DESCRIPTION

Various techniques for improving performance of a timing-based radio positioning system using assistance information are described below.

Actual Position

Figure 1A:
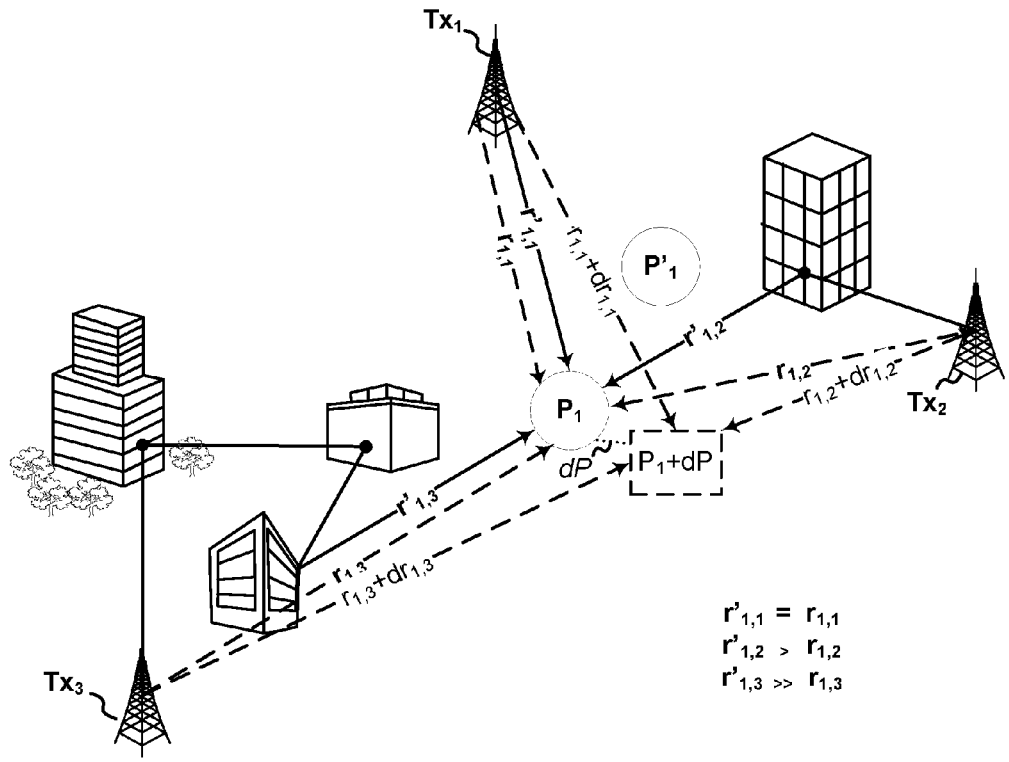
FIG. 1A depicts a positioning system where ranging signals that travel over particular distances are received by a receiver, and then used to estimate the position of the receiver.

Consider a given physical area with N ranging transmitters (e.g., $Tx_1$ to $Tx_N$). A receiver located in that physical area of N ranging transmitters has a position, $P_1$. The range to $P_1$ from $Tx_1$ is $r_{1,1}$, the range to $P_1$ from $Tx_2$ is $r_{1,2}$, the range to $P_1$ from $Tx_3$ is $r_{1,3}$, and so forth to $Tx_N$, where the range is $r_{1,N}$. By way of example, FIG. 1A illustrates three actual ranges ($r_{1,1}$, $r_{1,2}$, $r_{1,3}$) between position $P_1$ of a receiver and three transmitters ($Tx_1$, $Tx_2$ $Tx_3$, respectively). It should be observed that for any small displacement dP of the receiver from $P_1$ (e.g., to position $P_1+dP$ shown in FIG. 1A), the ranges from the various transmitters become $r_{1,1}+dr_{1,1}$, $r_{1,2}+dr_{1,2}$, $r_{1,3}+dr_{1,3}$, and so forth, and that the translation from $P_1$ to $P_1+dP$ is a smooth and continuous translation.

Measured Position

A fixed, timing-based radio positioning system allows an appropriately-equipped receiver to receive signals from multiple transmitters, and by computing the ranges to the various transmitters, estimate its position using the family of mathematical techniques collectively referred to as trilateration. As described previously, these range estimates, particularly in cluttered urban and indoor environments, can be subject to uncertainty and biases, and may not be an accurate estimate of actual ranges to the transmitters. Thus, the estimated position $P'_1$, as estimated using trilateration based on the estimated ranges $r'_{1,1}, r'_{1,2}, \ldots r'_{1,N}$ and the known transmitter locations $T_1$ through $T_N$, differs from the actual position $P_1$. The trilateration position estimate $P'_1$ can be written as:

$$P'_1 = f \begin{pmatrix} r'_{1,1} \\ r'_{1,2} \\ r'_{1,3} \\ \ldots \ldots \\ r'_{1,N} \end{pmatrix} \quad \text{(Equation 1)}$$

Figure 1B:
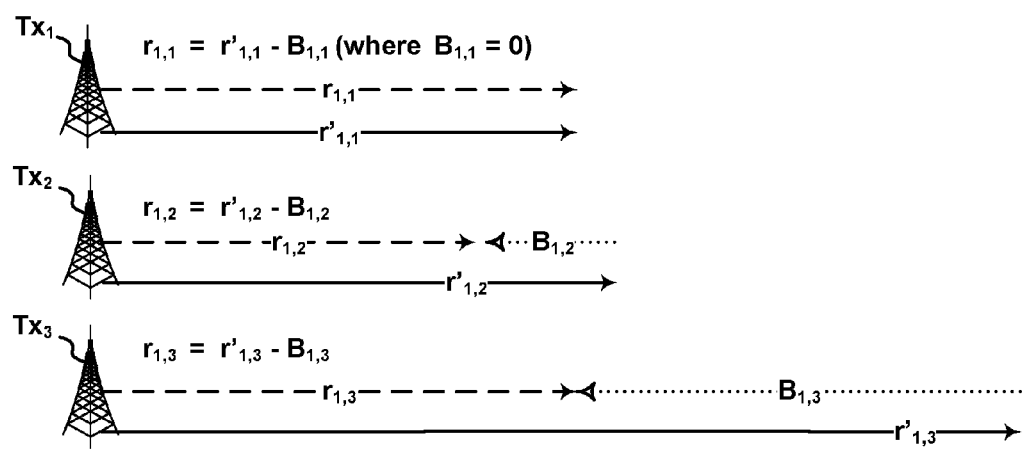
FIG. 1B illustrates differences between the distances traveled by the ranging signals from FIG. 1A and distances between respective transmitters and the receiver.

By way of example, FIG. 1A illustrates three measured ranges ($r'_{1,1}$, $r'_{1,2}$, $r'_{1,3}$) that correspond to ranging signals received by the receiver at position $P_1$ from the three transmitters ($Tx_1$, $Tx_2$, $Tx_3$, respectively). For purposes of illustration, $r'_{1,1}=r_{1,1}$, $r'_{1,2}>r_{1,2}$, and $r'_{1,3}>>r_{1,3}$. For purposes of further illustration, the estimated position $P'_1$ of the receiver is shown, which is determined using the measured ranges ($r'_{1,1}$, $r'_{1,2}$, $r'_{1,3}$), since the actual ranges ($r_{1,1}$, $r_{1,2}$, $r_{1,3}$) are not known. It is noted that the estimated position $P'_1$ is not equal to the actual position $P_1$, mainly because the measured ranges ($r'_{1,1}$, $r'_{1,2}$, $r'_{1,3}$) are not equal to the actual ranges ($r_{1,1}$, $r_{1,2}$, $r_{1,3}$). As illustrated in FIG. 1B, which pictorially compares each of the three measured ranges ($r'_{1,1}$, $r'_{1,2}$, $r'_{1,3}$) to each of the three actual ranges ($r_{1,1}$, $r_{1,2}$, $r_{1,3}$), differences between the actual and measured ranges may be represented by range biases $B_{1,1}$, $B_{1,2}$, $B_{1,3}$. Additional detail regarding range bias B is provided below.

Correcting Fixed Range Bias Based on Geometric System Properties

Because the sources of range bias are generally fixed (e.g., buildings), and the position of the transmitters is fixed, the mapping from P' to P can be characterized as a fixed term, $B_n$ at any position $P_n$. If for every position estimate $P'_n$ the exact bias term $B_n$ was known, the actual position $P_n$ could be determined. That is, $P=f(r'-B)$, and each individual range $r_n=r'_n-b_n$. Examples of $r_n=r'-B_n$ for a position $P_1$ and transmitters n=1, 2 and 3 are shown in FIG. 1B as $r_{1,1}=r'_{1,1}-B_{1,1}$, $r_{1,2}=r'_{1,2}-B_{1,2}$, and $r_{1,3}=r'_{1,3}-B_{1,3}$.

$$P_n = f \left[ \begin{pmatrix} r'_{n,1} \\ r'_{n,2} \\ r'_{n,3} \\ \ldots \ldots \\ r'_{n,N} \end{pmatrix} - B_n \right] \quad \text{(Equation 2)}$$

$$B_n = \begin{pmatrix} b_{n,1} \\ b_{n,2} \\ b_{n,3} \\ \ldots \ldots \\ b_{n,N} \end{pmatrix} \quad \text{(Equation 3)}$$

Note that bias vector B has several useful properties, among them: each element of B must be greater than or equal to zero in a well-calibrated system for every position P; B is generally fixed over long time horizons; the translation from $B_1$ to any $B_n$ is neither smooth nor continuous (each element of B can differ by great amounts between any two points in the service area, even if they are close together); and the components of B, unlike the components of P, are independent of one another. It is noted that B could be less than zero ("early arrival") in a system with timing challenges or if there is uncertainty about the arrival of the signal, which may require database tuning.

While physically possible, it is often impractical to precisely measure B for every position P in the service area. Thus, a method to estimate B and propagate B through the correction system would be advantageous. It is, however, practical to precisely measure B at some number of locations within a given service area. Thus a receiver at surveyed location P, with estimated position P' now has a known bias B=r'−r. B, along with the reported P' or the reported r', could be stored at some remote server or at the receiver. In the future, P' or r' could then be reported by the receiver to the server to look up B. By subtracting B from r', the trilateration computation could be re-run and P could thus be accurately computed. More explicitly, given P' and the associated measured ranges, $r'_1, r'_2, \ldots r'_N$, the actual ranges $r'_1-b_1=r_1$, $r'_2-b_2=r_2 \ldots r'_N-b_N=r_N$ could be computed, providing a basis to compute the actual position. Similarly, given a set of measured ranges, $r'_1, r'_2, \ldots r'_N$, the actual ranges $r'_1-b_1=r_1$, $r'_2-b_2=r_2 \ldots r'_N-b_N=r_N$ could be computed.

Now suppose there is a true position, $P_1$, and an estimate of that position, $P'_1$, with the known bias term $B_1$. Suppose also that there is a second position estimate, $P'_2$. Both estimates may be reported to a processor. Upon inspection, suppose that the individual range components of $P'_2$ are "close" (within some predefined margin) to the range components of $P'_1$. That is, $r'_{1,1}$ is close to $r'_{2,1}$, and $r'_{1,2}$ is close to $r'_{2,2}$ and so forth. Or, when inspected as a vector $r'_1$ is close to $r'_2$ in some sense (for example, in the norm-2 sense or in norm-1 sense). It is thus likely that $B_2$ is close to $B_1$ and $B_2$ can be set to $B_1$ as a first estimate.

For purposes of comparison, consider third position estimate $P'_3$ and fourth position estimate $P'_4$, as computed using trilateration. The following comparisons may be made between range measurements for $P'_3$ and range measurements of $P'_1$: $r'_{3,1} \sim r'_{1,1}$; $r'_{3,2} >> r'_{1,2}$; $r'_{3,3} \sim r'_{1,3}$; . . . ; $r'_{3,N} \sim r'_{1,N}$. The following comparisons may be made between range measurements for $P'_4$ and range measurements of $P'_1$: $r'_{4,1} \sim r'_{1,1}$; $r'_{4,2} << r'_{1,2}$; $r'_{4,3} \sim r'_{1,3}$; . . . ; $r'_{4,N} \sim r'_{1,N}$.

It is noted that "~" represents "nearly equal" (or equal), ">>" represents much larger than, and "<<" represents much less than. Note that when comparing measured ranges or pseudoranges or times-of-arrival (TOAs), it is assumed that the time bias nuisance parameter has been eliminated. For example, a maximum likelihood estimate of the time bias may be computed based on the transmission times of the transmitters, the TOA measurements at the receiver and the timing data associated with a hypothesized reference location. The measured TOA are then modified with this estimated bias, effectively changing them from estimated pseudoranges to estimated true ranges. True range estimate vectors can then be compared in a L1 or L2 sense or on an individual element basis. Alternatively, time differencing can be used relative to a reference beacon before the comparison is done.

In the case of $P'_3$, the range $r'_{3,2}$ is much longer than the range $r'_{1,2}$, but all of the other ranges are similar. The geometry of the network is such that this is not possible. We can then estimate $b'_{3,1}$, $b'_{3,2} \ldots d'_{3,N}$ directly as done for $B'_2$—but for $b'_{3,2}$ this will not work because $r'_{3,2}$ obviously has a much greater reflection profile compared to $r'_{1,2}$. One method to estimate $b'_{3,2}$ would be to set $b'_{3,2}=b'_{1,2}+(r'_{3,2}-r'_{1,2})-\text{mean}\{r'_{3,n}-r'_{1,n}$ (for $n \neq 2)\}$. Another method would be to drop $r'_{3,2}$ from the computation of the position altogether and estimate its bias after performing the trilateration calculation using $B_1$ as the estimated bias for all of the other ranges.

$$\text{Thus, } B_3' = \begin{pmatrix} b_{1,1} \\ b_{1,2} + C \\ b_{1,3} \\ \ldots \\ b_{1,N} \end{pmatrix}. \quad \text{(Equation 4)}$$

In the case of P'$_4$, the case is reversed. In this scenario, B'$_{1,n}$ can again be used as the initial bias estimate for B'$_{4,n}$ for every term except r'$_{4,2}$. In that case, based on the magnitude of the difference between the expected r'$_{4,2}$, either b'$_{4,2}$ should be set to zero or some other sensible value that is lower than the other biases (e.g. the value of $b_{1,2}$, minus a constant C as shown in Equation 5 below). The reason is that shorter ranges from otherwise apparently adjacent position estimates are typically more accurate—e.g., an unexpectedly short range implies the elimination of a reflection, and a path more closely related to the direct path from the transmitter to the receiver. Thus, $$B_4' = \begin{pmatrix} b_{1,1} \\ 0 \text{ or } (b_{1,2} - C) \\ b_{1,3} \\ \ldots \\ b_{1,N} \end{pmatrix}. \quad \text{(Equation 5)}$$

By applying this logic to estimated positions P'$_n$ that are close to the "surveyed position" P'$_1$, in terms of measured ranges, the fixed bias estimates can be "pushed" through the correction server, with improving estimates of bias through the collection of greater numbers of position estimates by receivers seeking to improve their position. Over time, additional range measurements and associated biases for particular surveyed positions can be added to the database, improving the ability of the system to propagate "good" bias estimates over the service area. These measurements may be based on actual surveyed points, or based upon "trusted" positioning references (e.g., well-known proximity sensors) that are combined with the system's standalone ranging estimates.

Note that the logic flow described above can be extended even to scenarios where an initial surveyed position is not known. Suppose that the bias for P'$_1$ above is not known, but that P'$_1$ and P'$_3$ have the same relationship, described by:

$$P_3' = f \begin{pmatrix} r_{3,1}' \sim r_{1,1}' \\ r_{3,2}' >> r_{1,2}' \\ r_{3,3}' \sim r_{1,3}' \\ \ldots \ldots \\ r_{3,N}' \sim r_{1,N}' \end{pmatrix}. \quad \text{(Equation 6)}$$

Also, assume that the confidence on P'$_1$ is higher than P'$_3$. In this case, by comparing r'$_1$ and r'$_3$, an initial bias estimate for P'$_3$ can be created by applying the fact that range biases are always "long". In this case, our initial estimate for the range bias B$_3$ could be estimated as:

$$B_3' = \begin{pmatrix} 0 \\ r_{3,2}' - r_{1,2}' + \text{average}(r_{3,n}' - r_{1,n}', \forall n \neq 2) \\ 0 \\ \ldots \ldots \\ 0 \end{pmatrix}. \quad \text{(Equation 7)}$$

Alternatively, P'$_3$ can be re-computed by ignoring r'$_{3,2}$ (based on the inspection of P'$_1$) and then inferring r'$_{3,2}$ from the geometry of the system and from there b'$_{3,2}$. Thus, with no external measured biases, a set of bias estimates can be created based on the geometric properties of the network. This latter observation in particular is applicable in transitions from zones where the fixed bias errors are low to directly adjacent zones where the fixed bias errors are high from certain directions, and not from others. For example, if one is shielded from one transmitter, only the ranges from that transmitter will show abnormally large ranges compared to "clean" measurements from short actual distances away, observable based on the otherwise similar range estimates. In a real system, the actual position estimates for a large number of cases are likely to be over-specified, which should permit further exploitation of the principles described.

Using Surveyed Locations to Identify Bias

Figure 2A:
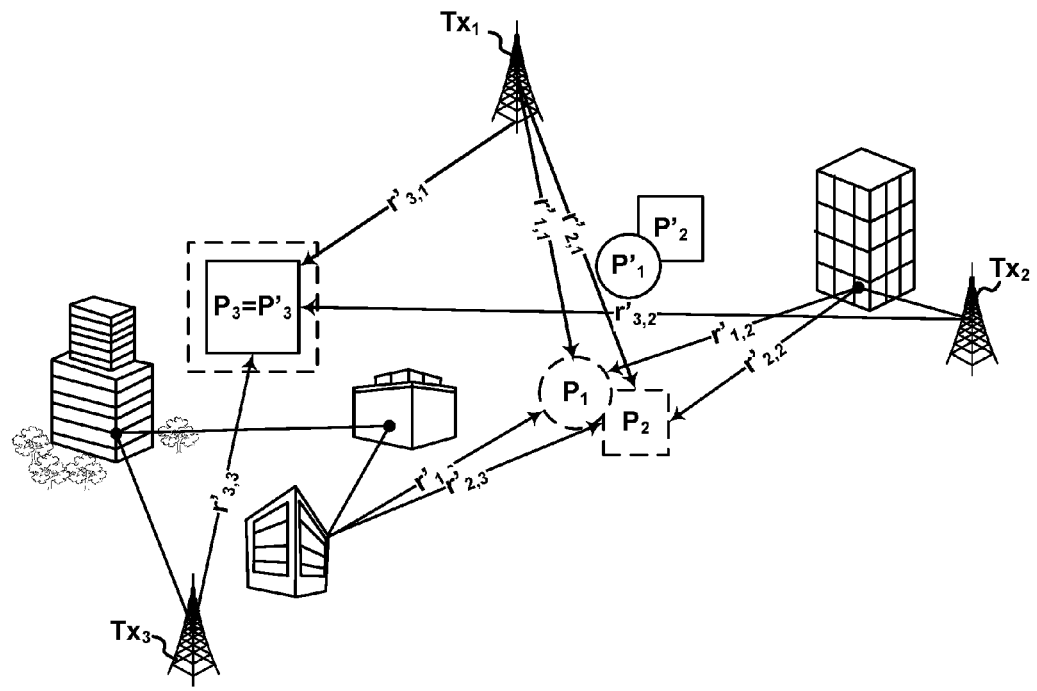
FIG. 2A depicts a positioning system where two positions are surveyed to determine biases corresponding to range measurements from ranging signals received at those positions.
Figure 2B:
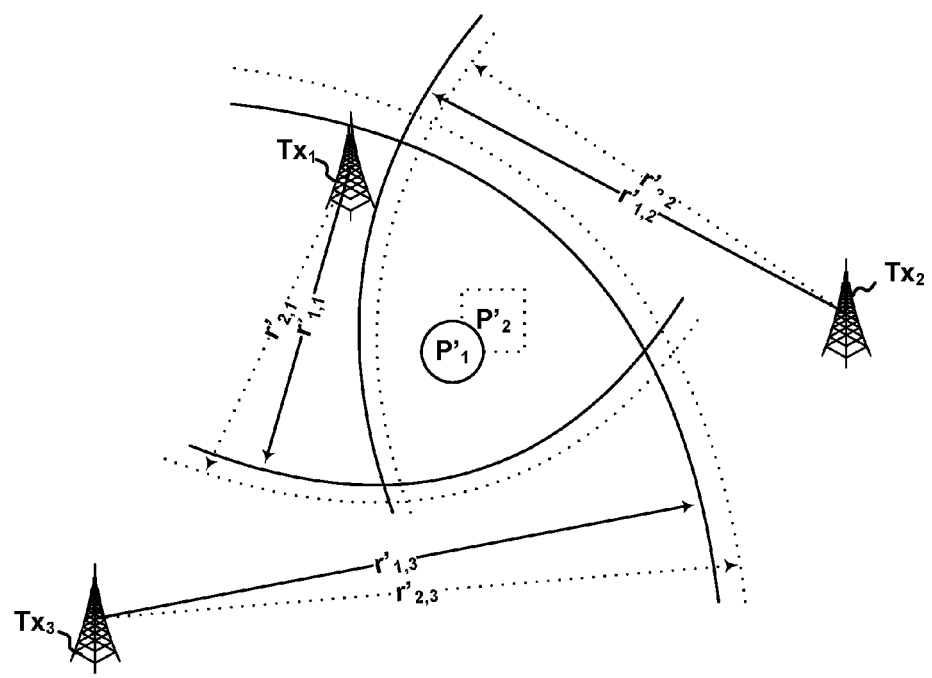
FIG. 2B illustrates geometric relationships between range measurements.

By way of illustration, FIG. 2A depicts an actual position P$_1$ of a receiver and two surveyed positions—P$_2$ and P$_3$. Estimated positions P'$_1$, P'$_2$ and P'$_3$ are also shown, which are determined using three measured ranges for each of the positions: r'$_{1,1}$, r'$_{1,2}$, r'$_{1,3}$ for P'$_1$; r'$_{2,1}$, r'$_{2,2}$, r'$_{2,3}$ for P'$_2$; and r'$_{3,1}$, r'$_{3,2}$, r'$_{3,3}$ for P'$_3$. For reference, as readily understood by one of skill in the art, FIG. 2B illustrates how P'$_1$ and P'$_2$ are determined during trilateration processing that uses the range measurements r'$_{1,1}$, r'$_{1,2}$, r'$_{1,3}$ extracted from ranging signals received at P$_1$, and the range measurement r'$_{2,1}$, r'$_{2,2}$, r'$_{2,3}$ extracted from ranging signals received at P$_2$.

Figure 2C:
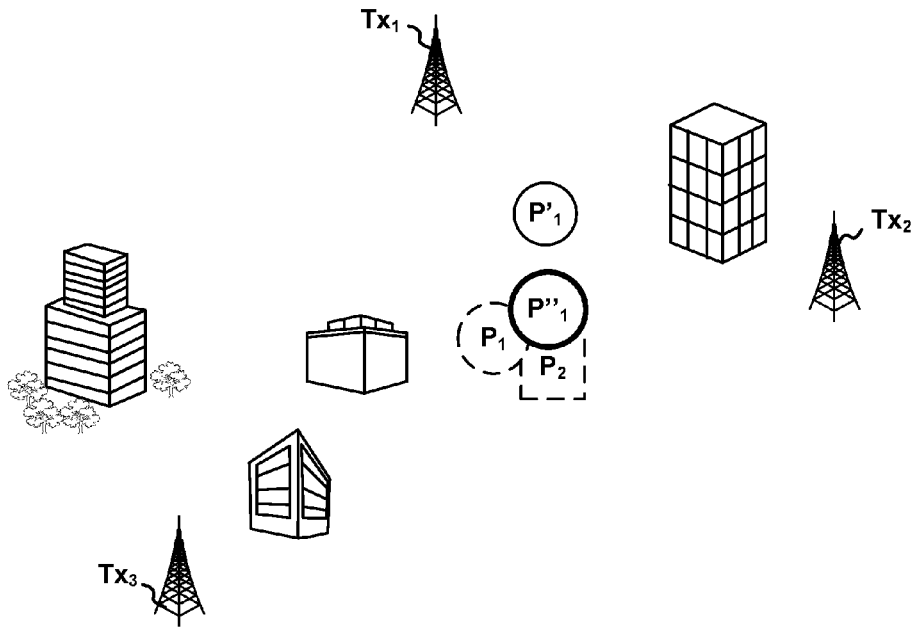
FIG. 2C illustrates a refined estimate of a receiver's position that is determined using biases of range measurements from ranging signals received at a surveyed position.

Attention is returned to FIG. 2A. As illustrated, since the locations of P$_1$ and P$_2$ are similar, the range measurements extracted from ranging signals at those positions are also similar. The similarity between the range measurements means that the estimated positions P'$_1$ and P'$_2$ are similar—e.g., because those estimated positions are computed using the similar range measurements. Thus, measured biases for range measurements corresponding to position P$_2$ are likely similar to unmeasured biases for the range measurements extracted from ranging signals received at position P$_1$. If the similar measured biases for range measurements corresponding to position P$_2$ are available, those measured biases may be used to adjust the range measurements extracted from ranging signals received at position P$_1$ to refine the initial estimated position P'$_1$ to an updated estimated position P'''$_1$ (as illustrated in FIG. 2C).

In FIG. 2A, the locations of P$_1$ and P$_3$ are not as similar to each other as the locations of P$_1$ and P$_2$. Consequently, measured biases for range measurements corresponding to position P$_3$ are probably not similar to unmeasured biases for range measurements extracted from ranging signals received at P$_1$. Thus, measured biases corresponding to P$_3$ would not be as reliable as measured biases corresponding to P$_2$ in terms of correcting for range error associated with the range measurements extracted from ranging signals received at position P$_1$.

Figure 3:
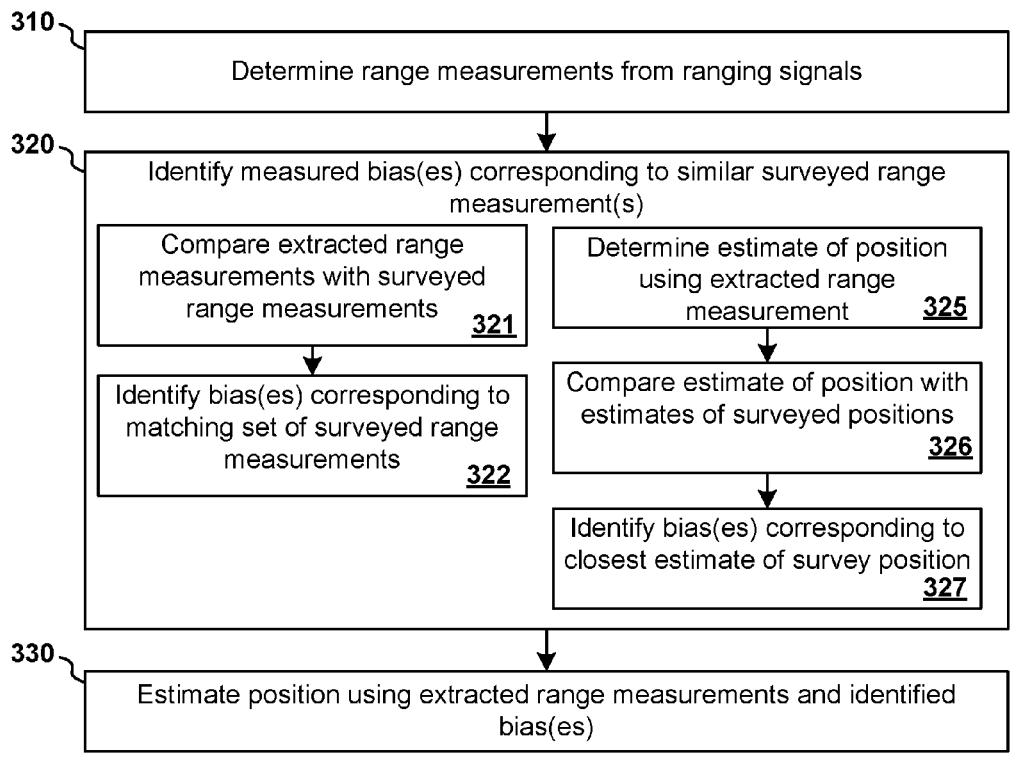
FIG. 3 illustrates a process for estimating a position of receiver using information corresponding to biases associated with a surveyed position.

FIG. 3 illustrates different methods for identifying measured biases that are similar to unknown biases corresponding to range measurements extracted from ranging signals that are received at an unknown position of a receiver.

Initially, ranging signals are received at a receiver from a first set of transmitters, and range measurements are extracted from the ranging signals (310). Measured biases, which correspond to surveyed range measurements that are similar to the extracted range measurements, are identified (320). Once measured biases are identified, an estimate of the receiver's position is computed using the extracted range measurements and the measured biases (330). For example, measured bias may be identified for an extracted range measurement that is not within a threshold amount of distance from a corresponding surveyed range measurement. The measured biases may be used to adjust those extracted range measurements, and the adjusted range measurements may be used during trilateration.

There are various approaches for identifying measured biases (320). For example, sets of surveyed range measurements corresponding to the first set of transmitters may be accessed from a data source, and the extracted range measurements may be compared to corresponding range measurements from each set (321), where comparisons are made between range measurements that correspond to the same transmitter. The set that matches the extracted range measurements is identified based on one or more matching criterion, and measured biases that relate to the range measurements of that set are identified (322).

Matching criteria may vary across embodiments that follow this approach. For example, the matching criteria may specify that a minimum number of surveyed range measurements from a set must be within a threshold amount of distance from corresponding extracted range measurements. The threshold amount may be predefined—e.g., based on an acceptable measurement error tolerance, the spacing between surveyed locations, or some other factor. A set matches the extracted range measurements when the minimum number is reached.

Alternatively, the matching criteria may specify that the set with the most surveyed range measurements that are within the threshold amount of distance from corresponding extracted range measurements is the only matching set. Of course, other ways of matching surveyed range measurements to extracted range measurements are possible.

Another approach for identifying measured biases (320) uses an initial estimate of the receiver's position that is based on the extracted range measurements (325). The initial estimate of position is compared to various estimates of surveyed positions (326). The estimates of the surveyed positions are each based on surveyed range measurements that were extracted from surveyed ranging signals received at that surveyed position. An estimate of a surveyed position that is closest to the initial estimate is selected, and measured biases that relate to surveyed range measurements for that estimated survey position are identified (327).

Correcting Fixed Bias by Using Velocity Estimates

In addition to comparing static position estimates across devices, velocity observations (e.g., observed from a number of sources including Doppler shift and inertial sensors placed on a receiver) (e.g., direction and speed corresponding to motion) can be used to identify a less accurate range measurement from among two range measurements that correspond to estimates of two sequential positions. Once the less accurate range measurement is identified, a portion of the bias associated with the less accurate measurement can be estimated using the measured velocity and differences between the two observed range measurements.

Assume that the difference between two range measurements, $r'_{1,n}$ and $r'_{2,n}$ for two positions of a receiver has been observed (in terms of magnitude and/or direction). Also assume that the velocity, v, corresponding to movement between the two positions has been observed (in terms of magnitude and/or direction). The system can then compare each $r'_{1,n}$ and $r'_{2,n}$ with the following general logic (where consistent units of measurement are used): if $r'_{1,n}+v_n=r'_{2,n}$, the bias at the two positions from $Tx_N$ is the same; if $r'_{1,n}+v_n>r'_{2,n}$, then replace $r'_{1,n}$ with $r'_{2,n}-v_n$, because the bias at $r'_{1,n}$ was observed to be greater than the bias at $r'_{2,n}$; and if $r'_{1,n}+v_n<r'_{2,n}$, then replace $r'_{2,n}$ with $r'_{1,n}+v_n$, because the bias at $r'_{2,n}$ was observed to be greater than the bias at $r'_{1,n}$. Thus, the velocity estimate can help create a bias estimate that is as good as the most-accurate range recorded at each of points 1 and 2. The bias estimate may not account for all bias, but can be used to scale down bias associated with one range measurement.

It is recognized that many approaches are available to detect that $r'_1$ has a larger relative bias relative to $r'_2$, or that $r'_2$ has a larger relative bias relative to $r'_1$, based on measured movement of the receiver. One approach involves computing a first measurement of difference in range between $r'_1$ and $r'_2$, (in terms of magnitude and direction), and then comparing the first measurement to a second measurement of distance associated with the measured velocity (in terms of magnitude and direction).

Another approach involves determining a first measurement corresponding to a combination of distance related to the measured velocity, and distance corresponding to $r'_1$, and then comparing the first measurement to a second measurement of distance corresponding to $r'_2$. Treatment of these comparisons are described above, and illustrations of these comparisons are provided in FIGS. 4A-D, which are described in more detail below.

Attention is drawn to two sets of figures—FIGS. 4A-B and FIGS. 4C-4D—where each set illustrates a different type of comparison between $r'_1$ and $r'_2$ from above. To simplify the examples, one range measurement is equal to the actual range between the receiver and the transmitter (Tx). The remaining range measurement has bias—e.g., the range measurement is extracted from a ranging signal that reflected off of a building. Each of the figure sets are provided for illustration in two dimensions. One of skill in the art will appreciate more complex scenarios and computations that extend the two-dimensional teachings to three dimensions. Such scenarios, while not necessarily illustrated in the figures, are contemplated.

Figure 4A:
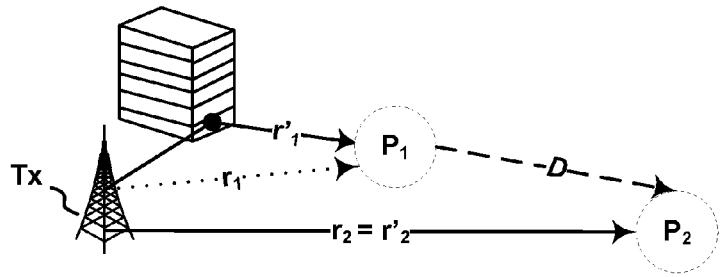
FIG. 4A and FIG. 4B illustrate a circumstance for using detected movement between two instances in time to identify a bias corresponding to a position of the receiver at one of the instances in time.
Figure 4B:
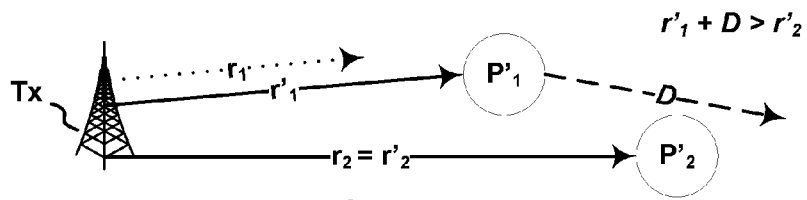

FIG. 4A and FIG. 4B illustrate the circumstance when the bias of $r'_1$ is observed to be greater than the bias for $r'_2$. As shown in FIG. 4A, $r'_1$ corresponds to a ranging signal from the transmitter (Tx) that arrives at a first position of the receiver ($P_1$) only after that signal reflects off of a building. FIG. 4A further illustrates a measured distance D, which refers to movement by a receiver from the first position ($P_1$) to a second position ($P_2$). By way of example, the measurement of the distance D may be based on measured velocity.

FIG. 4B includes estimates of the first position and the second position, as designated by $P'_1$ and $P'_2$, respectively. The estimated position $P'_1$ is significantly more inaccurate than the estimated position $P'_2$ because the length of $r'_1$ extends far beyond $r_1$ (i.e., the actual range between Tx and $P_1$), and the length of length of $r'_2$ does not extend as far beyond $r_2$ (i.e., the actual range between Tx and $P_2$). In fact, $r'_2=r_2$. FIG. 4B further illustrates that the combination of $r'_1$ and D is greater than $r'_2$.

Figure 4C:
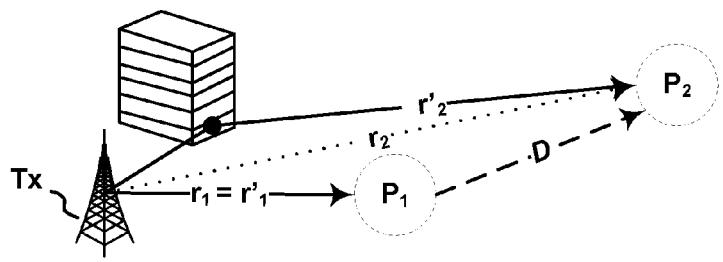
FIG. 4C and FIG. 4D illustrate another circumstance for using detected movement between two instances in time to identify a bias corresponding to a position of the receiver at one of the instances in time.
Figure 4D:
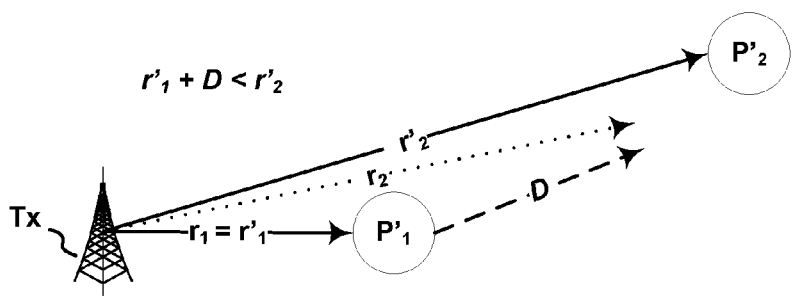

FIG. 4C and FIG. 4D illustrate the circumstance when the bias of $r'_1$ is observed to be greater than the bias for $r'_1$. As shown in FIG. 4C, $r'_2$ corresponds to a ranging signal from the transmitter (Tx) that arrives at a first position of the receiver ($P_2$) only after that signal reflects off of a building. FIG. 4C further illustrates a measured distance D, which refers to movement by a receiver from the first position ($P_1$) to a second position ($P_2$).

FIG. 4D includes estimates of the first position and the second position, as designated by $P'_1$ and $P'_2$, respectively. The estimated position $P'_2$ is significantly more inaccurate than the estimated position $P'_1$ because the length of $r'_2$ extends far beyond $r_2$ (i.e., the actual range between Tx and $P_1$), and the length of length of $r'_1$ does not extend as far beyond the $r_1$ (i.e., the actual range between Tx and $P_2$). In fact, $r'_1=r_1$. FIG. 4D further illustrates that the combination of $r'_1$ and D is less than $r'_2$.

Figure 5:
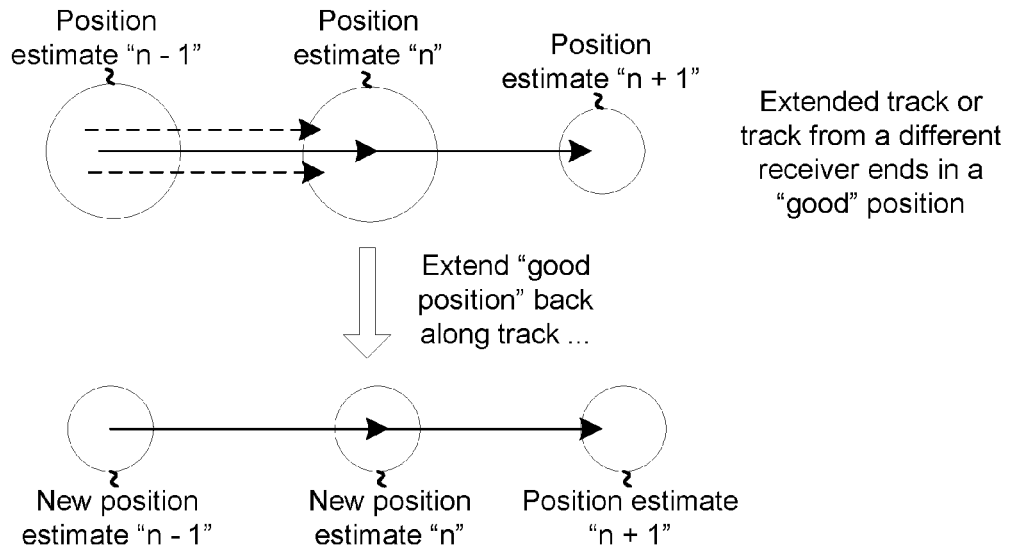
FIG. 5 pictorially illustrates methods for tracking receiver movement in order to identify inaccurate range measurements corresponding to one or more positions of the receiver during the movement.

It is contemplated that, over a longer track and over a larger number of points, estimates can be propagated through the system in a meaningful way. Consider positioning tracks illustrated in FIG. 5, which has consistent bias estimates for some number of position estimates n (e.g., the larger circles). At position n+1, one of the ranges is revealed to be too long (e.g., emerging from a building shadowing some number of transmitters). The good range estimate combined with the preceding velocity and range estimates can now provide a better bias estimate for every point along that positioning track before n+1, such that biases can be recorded for those points. Further, by recording the tracks (e.g., points of position and movement in between the points), any future intersection with a given track's estimated biases will benefit from the earlier track's information. Suppose sample n+1 is not observed by the first receiver. Later, a second receiver with the same set of ranging data intersects that track and does observe sample n+1. This would permit position correction to be propagated both for the new set of range samples for the second receiver and the prior, recorded set for the first receiver. Recording a receiver's track may be useful such that knowledge of biases at one of the points can be used to determine biases of the other points based on the recorded movement. Thus, biases can be determined for ambiguous points.

In accordance with certain embodiments, features of the system include: transmitters at fixed locations; and an environment that is fixed over the measurement horizon used to create bias estimates. Stale bias estimates (e.g., old estimates) are more likely to be affected by environmental perturbations (e.g., building demolition, elevated roadway construction), although in a well-utilized system these estimates should not become generally stale. This information can be combined with the position comparison techniques described above to create a better bias estimate for each position estimate reported to the system.

Use of Inertial Sensors

Inertial measurement systems suffer from drift if not occasionally corrected, however over short time durations they tend to yield accurate results. Particularly in the case where the radio reference system is fixed, using an inertial solution to measure instantaneous velocity and comparing that with the observed velocity derived from the static position estimates and time, and Doppler estimates, could meaningfully improve the overall velocity estimate. Further, by using the inertial system only for transient measurements rather than tracking, which is referenced back to the fixed radio network, observed drift issues can be mitigated or eliminated. In certain embodiments, only inertial sensors are used for a short duration to determine an offset in the system, and then holding it static through reference to the fixed radio reference system. Thus, it is possible to identify error by integrating measurements of velocity over a short time horizon, using inertial sensors (e.g., magnetometers, accelerometers, gyros, and the like). In some cases, the inertial solution is of very short duration, constantly referenced against a fixed radio environment, and used in a feedback loop with the radio positioning and velocity estimates.

Measurement Uncertainty

In addition to fixed range biases, the reported ranges, r, for a given position are often "noisy" and could be better characterized as a histogram. These histograms will be "shifted" by the fixed range bias imparted by the environment in which the measurement is taken, and their dispersion can be attributed to both RF noise and the geometry of the system, among other properties. It is probable that these well-understood characteristics can also be exploited to improve the quality of positioning in the system.

One net effect on the preceding concepts includes characterization of any range as a distribution instead of a number, and using a database and server to compare range distributions instead of fixed ranges. The general concepts are unaffected. One implementation contemplates that measurements showing a large degree of variability can be discounted in the positioning calculation.

Example Methodologies

Functionality and operation disclosed herein may be embodied as one or more methods implemented by processor(s) at one or more locations. Non-transitory processor-readable media embodying program instructions adapted to be executed to implement the method(s) are also contemplated. The program instructions may be contained in at least one semiconductor chip.

By way of example, not by way of limitation, method(s) may comprise: determining a first set of range measurements using a first set of ranging signals received at a first position in a transmitter network; determining one or more range error adjustments that are associated with a second set of range measurements from a second set of signals received at a second position in the transmitter network; and estimating the first position using the first set of range measurements and the one or more range error adjustments that are associated with the second set of range measurements.

In accordance with some aspects, the one or more range error adjustments that are associated with the second set of range measurements are identified by: determining a first estimated position using the first set of range measurements; identifying a second estimated position, from among stored estimated positions, that is closest to the first estimate position, wherein the second estimated position is based on the second set of range measurements; and identifying the one or more range error adjustments after identifying the second estimated position.

In accordance with some aspects, the one or more range error adjustments that are associated with the second set of range measurements are identified by: identifying the second set of range measurements, from among stored sets of range measurements, based on a matching criterion; and identifying the one or more range error adjustments after identifying the second set of range measurements based on the matching criterion.

Method(s) may further or alternatively comprise: determining a first number of range measurements in the first set of range measurements that are within a threshold amount of distance from corresponding range measurements in the second set of range measurements; determining a second number of range measurements in the first set of range measurements that are within the threshold amount of distance from corresponding range measurements in another stored set of range measurements, wherein the second set of range measurements is selected over the other stored set of range measurements when the first number is greater than the second number.

In accordance with some aspects, the one or more range error adjustments that are associated with the second set of range measurements are identified by: selecting the second set of range measurements, from among stored sets of range measurements, when each of a first subset of n range measurements from the first set of range measurements and each of a second subset of n range measurements from the second set of range measurements are within a threshold amount of distance from each other; identifying a first range measurement in the first set of range measurements and a corresponding second range measurement in the second set of range measurements that are not within the threshold amount of distance from each other; and determining a first range error adjustment based on a relationship between the first range measurement and the second range measurement, wherein the one or more range error adjustments includes the first range error adjustment.

In accordance with some aspects, the first range error adjustment is determined based on (i) a measure of a difference between the first range measurement and the second range measurement, and (ii) measures of differences between each range measurement in the first subset of n range measurements and each corresponding range measurement in the second subset of n range measurements.

In accordance with some aspects, the first range error adjustment is determined based on a measure of a difference between (i) a mean of differences between each range measurement in the first subset of n range measurements and each corresponding range measurement in the second subset of n range measurements from (ii) a difference between the first range measurement and the second range measurement.

In accordance with some aspects, the first range error adjustment is determined by: determining whether the first range measurement is greater than or less than the second range measurement; and upon determining that the first range measurement is greater than the second range measurement, estimating the first position using the range measurements in the first subset of n range measurements, but without using the first range measurement.

In accordance with some aspects, the first range error adjustment is determined by: determining whether the first range measurement is greater than or less than the second range measurement, wherein based on determining that the first range measurement is less than the second range measurement, the first range error adjustment is set to zero.

In accordance with some aspects, the first subset of n range measurements includes a majority of the range measurements in the first set of range measurements.

In accordance with some aspects, the one or more range error adjustments include one or more range biases that correspond to the second set of range measurements.

In accordance with some aspects, the second and first positions correspond to positions of a receiver at different times.

Method(s) may further or alternatively comprise: estimating a velocity of the receiver between the second position and the first position; and determining, based on the estimated velocity, whether a first range measurement from the first set of range measurements is more or less accurate a second range measurement from the second set of range measurements.

In accordance with some aspects, the second range measurement is determined to be less accurate than the first range measurement when a measure of a difference between the first range measurement and the second range measurement is less than a measure of a distance that is based on the estimated velocity.

In accordance with some aspects, the first range measurement is determined to be less accurate than the second range measurement when a measure of a difference between the first range measurement and the second range measurement is greater than the measure of the distance that is based on the estimated velocity.

In accordance with some aspects, the second range measurement is stored.

Method(s) may further or alternatively comprise: storing the first range measurement in another set of stored range measurements; after determining that the second range measurement is less accurate than the first range measurement, replacing the stored second range measurement with a value corresponding to the first range measurement adjusted by a measure of a distance that is based on the estimated velocity; and after determining that the first range measurement is less accurate than the second range measurement, replacing the stored first range measurement with a value corresponding to the second range measurement adjusted by the measure of the distance that is based on the estimated velocity.

Any portion of the functionality embodied in the method(s) above may be combined with any other portion of that functionality.

Systems that carry out functionality (e.g., embodied as methods) may include one or more devices, including transmitter(s) from which position information is sent, receiver(s) at which position information is received, processor(s)/server(s) used to compute a position of a receiver and carry out other functionality, input/output (I/O) device(s), data source(s) and/or other device(s). Outputs from a first device or group of devices may be received and used by another device during performance of methods. Accordingly, an output from one device may cause another device to perform a method even where the two devices are no co-located (e.g., a receiver in a network of transmitters and a server in another country). Additionally, one or more computers may be programmed to carry out various methods, and instructions stored on one or more processor-readable media may be executed by a processor to perform various methods.

Example Systems & Other Aspects

Figure 6:
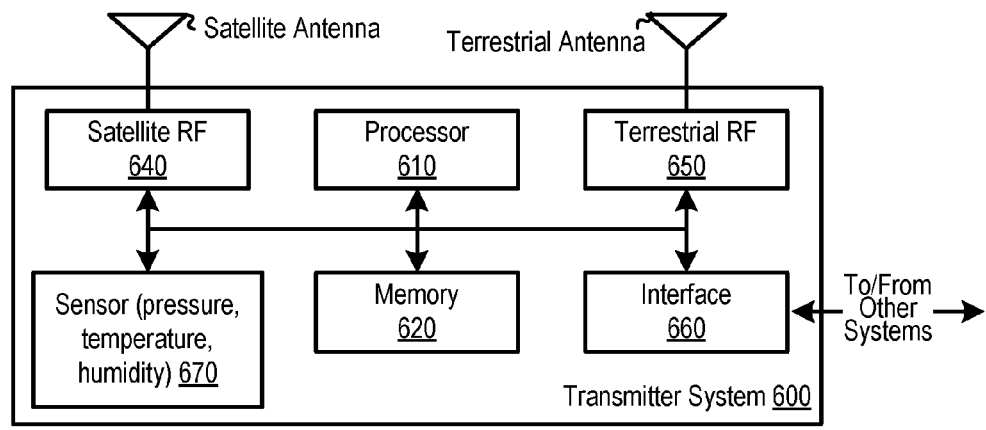
FIG. 6 depicts aspects of a transmitter system.

FIG. 6 illustrates details of transmitter system 600 at which signals may be generated and transmitted. Transmitter system 600 may include processor 610 that carries out signal processing (e.g., interpreting received signals and generating transmission signals). One or more memories 620 may provide storage and retrieval of data and/or executable instructions for performing functions described herein. Transmitter system 600 may further include one or more antenna components (e.g., satellite antenna or terrestrial antenna) for transmitting and receiving signals, satellite RF component 640 for receiving satellite signals, from which location information and/or other information (e.g., timing, dilution of precision (DOP), or other) may be extracted, terrestrial RF component 650 for receiving signals from a terrestrial network, and/or for generating and sending output signals, and interface 660 for communicating with other systems. Transmitter system 600 may also include one or more environmental sensors 670 for sensing environmental conditions (e.g., pressure, temperature, humidity, wind, sound, or other), which may be compared to such conditions as sensed at a receiver in order to estimate a position of the receiver based on similarities and differences between the conditions at transmitter system 600 and the receiver. It is noted that transmitter system 600 may be implemented by the transmitters described herein, which may alternatively take on other forms as known by one of skill in the art. Each transmitter system 600 may also include various elements as are known or developed in the art for providing output signals to, and receiving input signals from, the antennas, including analog or digital logic and power circuitry, signal processing circuitry, tuning circuitry, buffer and power amplifiers, and the like.

Figure 7:
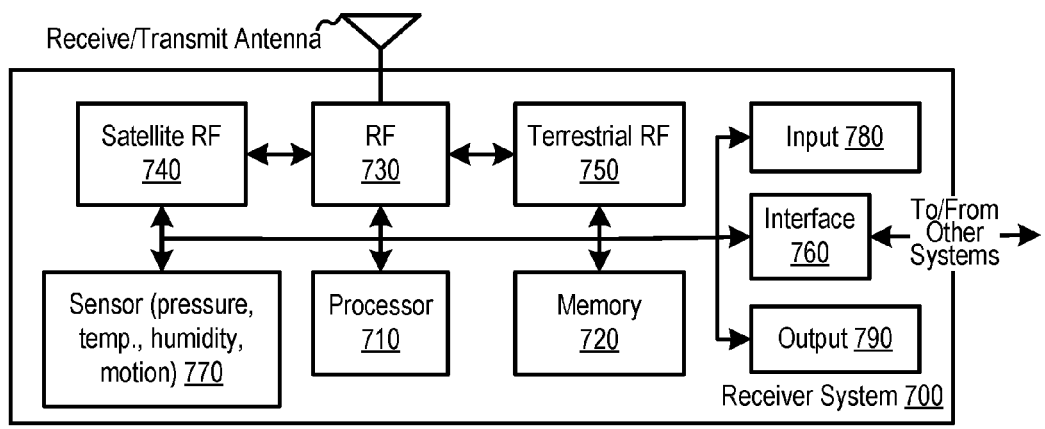
FIG. 7 depicts aspects of a receiver system.

FIG. 7 illustrates details of receiver system 700, at which signals from transmitters (e.g., transmitter system 600) may be received and processed to extract information used to compute an estimated position of receiver system 700. Receiver system 700 may include any of a variety of electronic devices configured to receive RF or other signaling using wireless means (radio frequency, Wi-Fi, Wi-Max, Bluetooth, or other wireless channels as is known or later developed in the art), or wired means (e.g., Ethernet, USB, flash RAM, or other similar channels as is known or later developed in the art). Each receiver system 700 may be in the form of a cellular or smart phone, a tablet device, a PDA, a notebook or other computing device. It is noted that User Equipment (UE), Mobile Station (MS), User Terminal (UT), SUPL Enabled Terminal (SET), Receiver (Rx), and Mobile Device may be used to refer to receiver system 700. As shown, RF component 730 may control the exchange of information with other systems (e.g., satellite, terrestrial). Signal processing may occur at satellite component 740 for receiving satellite signals, or terrestrial component 750, which may use separate or shared resources such as antennas, RF circuitry, and the like. One or more memories 720 may be coupled to a processor 710 to provide storage and retrieval of data and/or instructions relating to methodologies described herein that may be executed by processor 710. Receiver system 700 may further include one or more sensors 770 for measuring environmental conditions like pressure, temperature, humidity, acceleration, direction of travel, wind force, wind direction, sound, or other conditions. Receiver system 700 may further include input and output (I/O) components 780 and 790, which may include a keypad, touchscreen display, camera, microphone, speaker, or others, which may be controlled by means known in the art. It is noted that receiver system 700 may be implemented by the receivers described herein, which may alternatively take on other forms as known by one of skill.

In some embodiments, transmitter system 600 and/or receiver system 700 may be connected, via various wired or wireless communication link, to a server system (not shown), which may receive/send information from/to transmitter system 600 and/or receiver system 700. The server system may also control operations of transmitter system 600 and/or receiver system 700. Some or all processing that can be performed at transmitter system 600 and/or receiver system 700 may alternatively be performed by a one or more processors that are remote from those systems (e.g., in a different city, state, region, or country). Such remote processors may be located at the server system. Thus, processing may be geographically distributed. Processing in one system or component may be initiated by another system (e.g., upon receipt of signals or information from the other system.

Various techniques are used to estimate the position of an receiver, including trilateration, which is the process of using geometry to estimate a location of the receiver using distances (or "ranges") traveled by different "ranging" signals that are received by the receiver from different transmitters (or antennas when using a multi-antenna configuration). If the time of transmission of a ranging signal from a transmitter and the reception time of the ranging signal (e.g., time of arrival) are known, then the difference between those times multiplied by speed of light would provide an estimate of the distance traveled by that ranging signal. These estimates are often referred to as "range measurements". In most cases, the range measurements are not equal to the actual ranges (i.e., shortest distances) between transmitters 110 and the receiver 120, mainly because signals reflect off of objects (e.g., walls and other structures of buildings 190) that are disposed between or near the transmitters 110 and the receiver 120. Consequently, the estimate of the receiver's position does not necessarily overlap the actual position.

Discussion regarding comparisons of distance applies to comparisons of velocity. Similarly, the discussion applies to comparisons of values after each of those values have been modified by the same mathematical operation (e.g., value x multiplier, $value^2$, |value|, value converted to different units of measurement, or some other operation that produces a new value from the original value).

In addition to identifying bias corresponding to a measurement of range, aspects described elsewhere herein in relation detection of range biases may similarly apply to early peak detection, or detection of other characteristics of RF signals.

The various illustrative systems, methods, logical features, blocks, modules, components, circuits, and algorithm steps described herein may be implemented, performed, or otherwise controlled by suitable hardware known or later developed in the art, or by firmware or software executed by processor(s), or any such combination of hardware, software and firmware. Systems may include one or more devices or means that implement the functionality (e.g., embodied as methods) described herein. For example, such devices or means may include processor(s) that, when executing instructions, perform any of the methods disclosed herein. Such instructions can be embodied in software, firmware and/or hardware. A processor (also referred to as a "processing device") may perform or otherwise carry out any of the operational steps, processing steps, computational steps, method steps, or other functionality disclosed herein, including analysis, manipulation, conversion or creation of data, or other operations on data. A processor may include a general purpose processor, a digital signal processor (DSP), an integrated circuit, a server, other programmable logic device, or any combination thereof. A processor may be a conventional processor, microprocessor, controller, microcontroller, or state machine. A processor can also refer to a chip or part of a chip (e.g., semiconductor chip). The term "processor" may refer to one, two or more processors of the same or different types. It is noted that a computer, computing device and receiver, and the like, may refer to devices that include a processor, or may be equivalent to the processor itself.

A "memory" may accessible by a processor such that the processor can read information from and/or write information to the memory. Memory may be integral with or separate from the processor. Instructions may reside in such memory (e.g., RAM, flash, ROM, EPROM, EEPROM, registers, disk storage), or any other form of storage medium. Memory may include a non-transitory processor-readable medium having processor-readable program code (e.g., instructions) embodied therein that is adapted to be executed to implement the various methods disclosed herein. Processor-readable media be any available storage media, including non-volatile media (e.g., optical, magnetic, semiconductor) and carrier waves that transfer data and instructions through wireless, optical, or wired signaling media over a network using network transfer protocols. Instructions embodied in software can be downloaded to reside on and operated from different platforms used by known operating systems. Instructions embodied in firmware can be contained in an integrated circuit or other suitable device.

Functionality disclosed herein may be programmed into any of a variety of circuitry that is suitable for such purpose as understood by one of skill in the art. For example, functionality may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof. Data, instructions, commands, information, signals, bits, symbols, and chips disclosed herein may be represented by voltages, currents, electromagnetic waves, magnetic fields or particles, optical fields or particles, or any combination thereof. Computing networks may be used to carry out functionality and may include hardware components (servers, monitors, I/O, network connection). Application programs may carry out aspects by receiving, converting, processing, storing, retrieving, transferring and/or exporting data, which may be stored in a hierarchical, network, relational, non-relational, object-oriented, or other data source.

"Data" and "information" may be used interchangeably. A data source which is depicted as a single storage device may be realized by multiple (e.g., distributed) storage devices. A data source may include one or more types of data sources, including hierarchical, network, relational, non-relational, object-oriented, or another type of data source. As used herein, computer-readable media includes all forms of computer-readable medium except, to the extent that such media is deemed to be non-statutory (e.g., transitory propagating signals).

Features in system and apparatus figures that are illustrated as rectangles may refer to hardware, firmware or software. It is noted that lines linking two such features may be illustrative of data transfer between those features. Such transfer may occur directly between those features or through intermediate features even if not illustrated. Where no line connects two features, transfer of data between those features is contemplated unless otherwise stated. Accordingly, the lines are provide to illustrate certain aspects, but should not be interpreted as limiting. The words "comprise," "comprising," "include," "including" and the like are to be construed in an inclusive sense (i.e., not limited to) as opposed to an exclusive sense (i.e., consisting only of). Words using the singular or plural number also include the plural or singular number respectively. The words "or" or "and" cover both any of the items and all of the items in a list. "Some" and "any" and "at least one" refers to one or more. The term "device" may comprise one or more components (e.g., a processor, a memory, a receiver, a screen, and others). The disclosure is not intended to be limited to the aspects shown herein but is to be accorded the widest scope understood by a skilled artisan, including equivalent systems and methods.

The invention claimed is:

1. A method for computing an estimate of a position of a receiver using range error adjustments associated with one or more range measurements, the method comprising:
   determining a first set of range measurements using a first set of ranging signals received at the position of the receiver in a transmitter network from a set of terrestrial transmitters;
   comparing the first set of range measurements to a second set of range measurements determined using a second set of ranging signals received at a surveyed position in the transmitter network from the set of terrestrial transmitters;
   determining if the second set of range measurements matches the first set of range measurements based on one or more matching criterion; and
   if the second set of range measurements matches the first set of range measurements based on the one or more matching criterion, using one or more processors to compute the estimate of the position of the receiver using the first set of range measurements and a set of one or more range error adjustments that are associated with the second set of range measurements.

2. The method of claim 1, the method comprising:
   determining a first number of range measurements in the first set of range measurements that are within a threshold amount of distance from corresponding range measurements in the second set of range measurements; and
   determining a second number of range measurements in the first set of range measurements that are within the threshold amount of distance from corresponding range measurements in a third-set of range measurements determined using a third set of ranging signals received at another surveyed position from the set of terrestrial transmitters,
   wherein the second set of range measurements matches the first set of range measurements when the first number is greater than the second number.

3. The method of claim 2, the method comprising:
   determining if the third set of range measurements matches the first set of range measurements based on the one or more matching criterion, wherein the third set of range measurements matches the first set of range measurements when the second number is greater than the first number; and
   if the third set of range measurements matches the first set of range measurements based on the one or more matching criterion, computing the estimate of the position of the receiver using the first set of range measurements and another set of one or more range error adjustments that are associated with the third set of range measurements.

4. The method of claim 1, wherein the set of one or more range error adjustments are identified by:
   selecting the second set of range measurements, from among stored sets of range measurements, when each range measurement of a first subset of n range measurements from the first set of range measurements is within a threshold amount of distance from each range measurement of a second subset of n range measurements from the second set of range measurements;

identifying a first range measurement in the first set of range measurements and a corresponding second range measurement in the second set of range measurements that are not within the threshold amount of distance from each other;

determining a first range error adjustment based on a relationship between the first range measurement and the second range measurement; and adjusting the first range measurement by the first range error adjustment, wherein the estimate of the position of the receiver is computed using the adjusted first range measurement.

5. The method of claim 4, wherein the first range error adjustment is determined based on (i) a difference between the first range measurement and the second range measurement, and (ii) each difference between each range measurement in the first subset of n range measurements and the range measurement in the second subset of n range measurements corresponding to that range measurement in the first subset of n range measurements.

6. The method of claim 4, wherein the first range error adjustment is determined based on a difference between (i) a mean or average of each difference between each range measurement in the first subset of n range measurements and the range measurement in the second subset of n range measurements corresponding to that range measurement in the first subset of n range measurements, and (ii) a difference between the first range measurement and the second range measurement.

7. The method of claim 4, wherein the first range error adjustment is determined by:

determining whether the first range measurement is greater than or less than the second range measurement; and upon determining that the first range measurement is greater than the second range measurement, estimating the first position using the range measurements in the first subset of n range measurements, but without using the first range measurement.

8. The method of claim 4, wherein the first range error adjustment is determined by:

determining whether the first range measurement is greater than or less than the second range measurement, wherein based on determining that the first range measurement is less than the second range measurement, the first range error adjustment is set to zero.

9. The method of claim 4, wherein the first subset of n range measurements includes a majority of the range measurements in the first set of range measurements.

10. The method of claim 1, wherein the set of one or more range error adjustments include one or more range biases that correspond to one or more range measurements in the second set of range measurements.

11. The method of claim 1, wherein the step of determining if the second set of range measurements matches the first set of range measurements based on the one or more matching criterion comprises:

determining that the second set of range measurements matches the first set of range measurements based on the one or more matching criterion when a majority of the first set of range measurements are within a threshold amount of distance from range measurements in the second set of range measurements.

12. The method of claim 1, wherein the method comprises:

comparing the first set of range measurements to a third set of range measurements determined using a third set of ranging signals received at another surveyed position from the set of terrestrial transmitters; and determining that the second set of range measurements, not the third set of range measurements, matches the first set of range measurements based on the one or more matching criterion when the second set of range measurements includes more range measurements than the third set of range measurements that are within a threshold amount of distance from range measurements in the first set of range measurements.

13. The method of claim 1, wherein:

the set of terrestrial transmitters includes a first transmitter from which a ranging signal of the first set of ranging signals is received at the position of the receiver, and from which a ranging signal of the second set of ranging signals is received at the surveyed position, the first set of range measurements includes a range measurement determined using the ranging signal of the first set of ranging signals, the set of one or more range error adjustments includes a range error adjustment associated with the ranging signal of the second set of ranging signals, and the step of computing the estimate of the position of the receiver using the first set of range measurements and the set of one or more range error adjustments comprises:

adjusting the range measurement of the first set of range measurements by the range error adjustment associated with the ranging signal of the second set of ranging signals.

14. The method of claim 13, wherein:

the second set of range measurements includes a range measurement determined using the ranging signal of the second set of ranging signals, and the range measurement of the first set of range measurements is adjusted by the range error adjustment only when the range measurement of the first set of range measurements is not within a threshold amount of distance from the range measurement of the second set of range measurements.

15. The method of claim 1, wherein the surveyed position is different than the position of the receiver.

16. The method of claim 1, the method comprising:

identifying a first range measurement from the first set of range measurements that is longer than a second range measurement from the second set of range measurements, wherein the first range measurement was determined using a first signal from a transmitter in the set of terrestrial transmitters and the second range measurement was determined using a second signal from the transmitter;

computing a first range error adjustment using a stored range error adjustment from the set of one or more range error adjustments and a difference between the first range measurement and the second range measurement, wherein the stored range error adjustment is associated with the second range measurement; and adjusting the first range measurement by the first range error adjustment, wherein the estimate of the position of the receiver is computed using the adjusted first range measurement.

17. A system for computing an estimate of a position of a receiver using range error adjustments associated with one or more range measurements, wherein the system comprises one or more processors and one or more non-transitory processor-readable media storing instructions that are operable, when executed by the one or more processors, to cause the one or more processors to perform operations comprising:

determining a first set of range measurements using a first set of ranging signals received at the position of the receiver in a transmitter network from a set of terrestrial transmitters;

comparing the first set of range measurements to a second set of range measurements determined using a second set of ranging signals received at a surveyed position in the transmitter network from the set of terrestrial transmitters;

determining if the second set of range measurements matches the first set of range measurements based on one or more matching criterion; and if the second set of range measurements matches the first set of range measurements based on the one or more matching criterion, computing the estimate of the position of the receiver using the first set of range measurements and a set of one or more range error adjustments that are associated with the second set of range measurements.

18. One or more non-transitory processor-readable media embodying program instructions that, when executed by one or more processors, cause the one or more processors to perform a method for computing an estimate of a position of the receiver using range error adjustments associated with one or more range measurements, the method comprising:

determining a first set of range measurements using a first set of ranging signals received at the position of the receiver in a transmitter network from a set of terrestrial transmitters;

comparing the first set of range measurements to a second set of range measurements determined using a second set of ranging signals received at a surveyed position in the transmitter network from the set of terrestrial transmitters;

determining if the second set of range measurements matches the first set of range measurements based on one or more matching criterion; and if the second set of range measurements matches the first set of range measurements based on the one or more matching criterion, using one or more processors to compute an estimate of the position of the receiver using the first set of range measurements and a set of one or more range error adjustments that are associated with the second set of range measurements.

19. The non-transitory processor-readable media of claim 18, the method comprising:

determining a first number of range measurements in the first set of range measurements that are within a threshold amount of distance from corresponding range measurements in the second set of range measurements; and determining a second number of range measurements in the first set of range measurements that are within the threshold amount of distance from corresponding range measurements in a third set of range measurements determined using a third set of ranging signals received at another surveyed position from the set of terrestrial transmitters, wherein the second set of range measurements matches the first set of range measurements when the first number is greater than the second number.

20. The non-transitory processor-readable media of claim 18, wherein the set of one or more range error adjustments are identified by:

selecting the second set of range measurements, from among stored sets of range measurements, when each range measurement of a first subset of n range measurements from the first set of range measurements is within a threshold amount of distance from a corresponding range measurement of a second subset of n range measurements from the second set of range measurements;

identifying a first range measurement in the first set of range measurements and a corresponding second range measurement in the second set of range measurements that are not within the threshold amount of distance from each other;

determining a first range error adjustment based on a relationship between the first range measurement and the second range measurement; and adjusting the first range measurement by the first range error adjustment, wherein the estimate of the position of the receiver is computed using the adjusted first range measurement.

21. The non-transitory processor-readable media of claim 20, wherein the first range error adjustment is determined based on (i) a difference between the first range measurement and the second range measurement, and (ii) each difference between each range measurement in the first subset of n range measurements and the range measurement in the second subset of n range measurements corresponding to that range measurement in the first subset of n range measurements.

22. The non-transitory processor-readable media of claim 20, wherein the first range error adjustment is determined based on a difference between (i) a mean or average of each difference between each range measurement in the first subset of n range measurements and the range measurement in the second subset of n range measurements corresponding to that range measurement in the first subset of n range measurements, and (ii) a difference between the first range measurement and the second range measurement.

23. The non-transitory processor-readable media of claim 20, wherein the first range error adjustment is determined by:

determining whether the first range measurement is greater than or less than the second range measurement; and upon determining that the first range measurement is greater than the second range measurement, estimating the first position using the range measurements in the first subset of n range measurements, but without using the first range measurement.

24. The non-transitory processor-readable media of claim 20, wherein the first range error adjustment is determined by:

determining whether the first range measurement is greater than or less than the second range measurement, wherein based on determining that the first range measurement is less than the second range measurement, the first range error adjustment is set to zero.

25. The non-transitory processor-readable media of claim 20, wherein the first subset of n range measurements includes a majority of the range measurements in the first set of range measurements.

26. The non-transitory processor-readable media of claim 18, wherein the set of one or more range error adjustments include one or more range biases that correspond to one or more range measurements in the second set of range measurements.

27. The non-transitory processor-readable media of claim 18, wherein the step of determining if the second set of range measurements matches the first set of range measurements based on the one or more matching criterion comprises:
  determining that the second set of range measurements matches the first set of range measurements based on the one or more matching criterion when a majority of the first set of range measurements are within a threshold amount of distance from range measurements in the second set of range measurements.

28. The non-transitory processor-readable media of claim 18, wherein the method comprises:
  comparing the first set of range measurements to a third set of range measurements determined using a third set of ranging signals received at another surveyed position from the set of terrestrial transmitters; and
  determining that the second set of range measurements, not the third set of range measurements, matches the first set of range measurements based on the one or more matching criterion when the second set of range measurements includes more range measurements than the third set of range measurements that are within a threshold amount of distance from range measurements in the first set of range measurements.

29. The non-transitory processor-readable media of claim 18, wherein:
  the set of terrestrial transmitters includes a first transmitter from which a ranging signal of the first set of ranging signals is received at the position of the receiver, and from which a ranging signal of the second set of ranging signals is received at the surveyed position,
  the first set of range measurements includes a range measurement determined using the ranging signal of the first set of ranging signals,
  the set of one or more range error adjustments includes a range error adjustment associated with the ranging signal of the second set of ranging signals, and
  the step of computing the estimate of the position of the receiver using the first set of range measurements and the set of one or more range error adjustments comprises:
    adjusting the range measurement of the first set of range measurements by the range error adjustment associated with the ranging signal of the second set of ranging signals.

30. The non-transitory processor-readable media of claim 29, wherein:
  the second set of range measurements includes a range measurement determined using the ranging signal of the second set of ranging signals, and
  the range measurement of the first set of range measurements is adjusted by the range error adjustment only when the range measurement of the first set of range measurements is not within a threshold amount of distance from the range measurement of the second set of range measurements.

31. The non-transitory processor-readable media of claim 19, the method comprising:
  determining if the third set of range measurements matches the first set of range measurements based on the one or more matching criterion, wherein the third set of range measurements matches the first set of range measurements when the second number is greater than the first number; and
  if the third set of range measurements matches the first set of range measurements based on the one or more matching criterion, computing the estimate of the position of the receiver using the first set of range measurements and another set of one or more range error adjustments that are associated with the third set of range measurements.

32. The non-transitory processor-readable media of claim 18, wherein the surveyed position is different than the position of the receiver.

33. The non-transitory processor-readable media of claim 18, the method comprising:
  identifying a first range measurement from the first set of range measurements that is longer than a second range measurement from the second set of range measurements, wherein the first range measurement was determined using a first signal from a transmitter in the set of terrestrial transmitters and the second range measurement was determined using a second signal from the transmitter;
  computing a first range error adjustment using a stored range error adjustment from the set of one or more range error adjustments and a difference between the first range measurement and the second range measurement, wherein the stored range error adjustment is associated with the second range measurement; and
  adjusting the first range measurement by the first range error adjustment,
  wherein the estimate of the position of the receiver is computed using the adjusted first range measurement.

* * * * *